US012267662B2

(12) United States Patent
Scheek

(10) Patent No.: US 12,267,662 B2
(45) Date of Patent: Apr. 1, 2025

(54) LINE DAMPER BELLOWS DUAL OPPOSING DRIVER SPEAKER

(71) Applicant: Mayht Holding B.V., Santa Barbara, CA (US)

(72) Inventor: Mattias Jeffrey Scheek, Amsterdam (NL)

(73) Assignee: Mayt Holding B.V., Nieuw-Vennep (NL)

( * ) Notice: Subject to any disclaimer, the term of this patent is extended or adjusted under 35 U.S.C. 154(b) by 0 days.

(21) Appl. No.: 18/479,634

(22) Filed: Oct. 2, 2023

(65) Prior Publication Data

US 2024/0298117 A1 Sep. 5, 2024

Related U.S. Application Data

(63) Continuation of application No. 17/424,181, filed as application No. PCT/EP2019/055831 on Mar. 8, 2019, now Pat. No. 11,812,249.

(30) Foreign Application Priority Data

Feb. 7, 2019 (EP) .................................... 19155987

(51) Int. Cl.
*H04R 9/06* (2006.01)
*H04R 7/20* (2006.01)
(Continued)

(52) U.S. Cl.
CPC ............... *H04R 9/063* (2013.01); *H04R 7/20* (2013.01); *H04R 7/04* (2013.01); *H04R 7/16* (2013.01);
(Continued)

(58) Field of Classification Search
CPC ... H04R 7/04; H04R 7/16; H04R 7/20; H04R 9/025; H04R 9/06; H04R 9/063;
(Continued)

(56) References Cited

U.S. PATENT DOCUMENTS 3,772,466 A 11/1973 Hossbach
4,039,044 A * 8/1977 Heil ....................... H04R 9/063 381/186
(Continued)

FOREIGN PATENT DOCUMENTS

EP 1389853 A1 2/2004
JP S53123123 A 10/1978
(Continued)

OTHER PUBLICATIONS

AudioTron Quick Start Guide, Version 1.0, Mar. 2001, 24 pages.
(Continued)

*Primary Examiner* — Huyen D Le
(74) *Attorney, Agent, or Firm* — Fortem IP LLP

(57) ABSTRACT

A speaker device comprising two membranes facing each other, and two drive units arranged for driving the two membranes in opposite direction in operation. A vented frame element and a closed frame element are positioned outward on either side of the two membranes. At least one bellows element is connected on a first side to the membrane which is positioned closest to the closed frame element, and connected on a second side to the closed frame element.

17 Claims, 2 Drawing Sheets

(51) Int. Cl.
*H04R 7/04* (2006.01)
*H04R 7/16* (2006.01)
*H04R 9/02* (2006.01)

(52) U.S. Cl.
CPC ........ *H04R 9/025* (2013.01); *H04R 2205/022* (2013.01); *H04R 2209/027* (2013.01); *H04R 2307/027* (2013.01)

(58) Field of Classification Search
CPC ........ H04R 2205/022; H04R 2209/027; H04R 2307/027
See application file for complete search history.

(56) References Cited

U.S. PATENT DOCUMENTS

| | | | |
|---|---|---|---|
| 4,284,167 | A | 8/1981 | Kozlow et al. |
| 4,547,631 | A | 10/1985 | Nieuwendijk et al. |
| 4,783,820 | A | 11/1988 | Lyngdorf et al. |
| 4,817,165 | A | 3/1989 | Amalaha |
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,641,938 | B2 | 5/2017 | Bushko et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2004/0120542 | A1 | 6/2004 | Morris |
| 2007/0142944 | A1 | 6/2007 | Goldberg et al. |
| 2007/0154044 | A1 | 7/2007 | Oxford et al. |
| 2010/0232637 | A1 | 9/2010 | Kowaki et al. |
| 2023/0097602 | A1 * | 3/2023 | Pfeffer .................. H04R 9/025 381/412 |

FOREIGN PATENT DOCUMENTS

| | | | |
|---|---|---|---|
| JP | S6251900 | A | 3/1987 |
| JP | 2008072703 | A | 3/2008 |
| WO | 200153994 | | 7/2001 |
| WO | 2003093950 | A2 | 11/2003 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, European EPC Article 94.3 mailed on Jul. 25, 2023, issued in connection with European Application No. 19709487.3, 5 pages.

International Searching Authority, International Search Report and Written Opinion mailed on May 2, 2019, issued in connection with International Application No. PCT/EP2019/055831, filed on Mar. 8, 2019, 11 pages.

Japanese Patent Office, English Translation of Office Action mailed on Jul. 11, 2023, issued in connection with Japanese Application No. 2021-544359, 4 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Korean Patent Office, Korean Preliminary Rejection and Translation mailed on Dec. 6, 2023, issued in connection with Korean Application No. 10-2021-7024545, 8 pages.

Louderback, Jim, "Affordable Audio Receiver Furnishes Homes With MP3," TechTV Vault. Jun. 28, 2000 retrieved Jul. 10, 2014, 2 pages.

Notice of Allowance mailed on Jun. 14, 2023, issued in connection with U.S. Appl. No. 17/424,181, filed Jul. 20, 2021, 9 pages.

Palm, Inc., "Handbook for the Palm VII Handheld," May 2000, 311 pages.

Presentations at WinHEC 2000, May 2000, 138 pages.

Sonos, Inc. v. D&ampp;M Holdings (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

LINE DAMPER BELLOWS DUAL OPPOSING DRIVER SPEAKER

CROSS-REFERENCE TO RELATED APPLICATIONS

The present application is a continuation of U.S. patent application Ser. No. 17/424,181, filed Jul. 20, 2021, now U.S. Pat. No. 11,812,249, which is a 371 National Phase application of International Application No. PCT/EP2019/055831, filed Mar. 8, 2019, which claims priority to European Patent Application No. 19155987.1, filed Feb. 7, 2019, each of which is incorporated herein by reference in its entirety.

TECHNICAL FIELD

The present invention relates to a speaker device comprising two membranes facing each other, and two drive units, each arranged for driving one of the two membranes in opposite direction in operation.

BACKGROUND

Speaker devices are known from US patent publications U.S. Pat. Nos. 4,817,165 and 3,019,849. US patent publication U.S. Pat. No. 4,817,165 discloses a dome-shaped acoustic motor diaphragm having a core of aluminum foil in the form of a spider web configuration resulting in the dome shape. The diaphragm is in the form of an annular semi-dome outer diaphragm part and a dome-shaped cylindrical inner diaphragm part. US patent publication U.S. Pat. No. 3,019,849 discloses a suspension system for loudspeaker diaphragms allowing increased axial motion for the diaphragm without negative effect on the frontal area of the loudspeaker.

SUMMARY

The present invention seeks to provide a loudspeaker unit having an improved performance in space efficiency and power. According to the present invention, a speaker device as defined above is provided, further comprising a vented frame element and a closed frame element, which are positioned outward on either side of the two membranes, and at least one bellows element connected on a first side to the membrane which is positioned closest to the closed frame element, and connected on a second side to the closed frame element. The connections are provided to provide a substantially sealed compartment, and this allows to direct all air displacement towards a single surface, i.e. the air displacement of the two membranes is guided towards a single surface (in the vented frame element) through the at least one bellows element. The present invention structure and mutual element orientation allow to provide a more space efficient, light weight and cost effective loudspeaker unit.

BRIEF DESCRIPTION OF THE DRAWINGS

The present invention will be discussed in more detail below, with reference to the attached drawings, in which.

DETAILED DESCRIPTION

Figure 1:
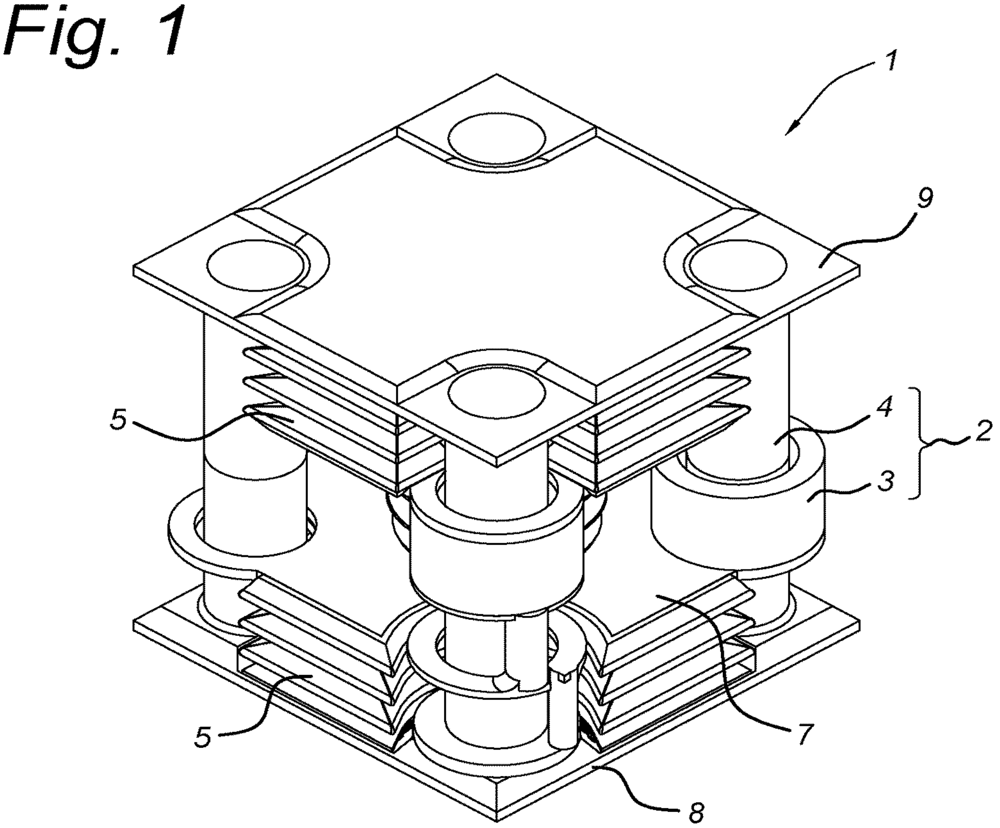
FIG. 1 shows a perspective view of an embodiment of a loudspeaker device according to an embodiment of the present invention.

The invention will be explained in detail with reference to some drawings that are only intended to show embodiments of the invention and not to limit the scope. The scope of the invention is defined in the annexed claims and by its technical equivalents. I.e., a person skilled in the art will understand that features, components, elements, etc. explicitly used to explain the invention can be substituted by technical equivalents unless otherwise stated. Moreover, separate features of different embodiments can be combined, even if not explicitly shown in the drawings or explained in the specification, unless such combination is physically impossible. The present invention will be discussed in more detail below, with reference to some drawings. The examples and embodiments described herein serve to illustrate rather than to limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single or multiple hardware items combining the features of the items described.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

In a speaker device 1 that uses a dual opposing driver principle in the classic sense, drivers 2 are placed in a back-to-back position. The benefit of this architecture is that the opposing drivers 2 cancel out mechanical vibrations of the enclosure of the speaker device 1. Because of this cancellation, the enclosure is affected significantly less by the movement of the drivers 2, even if the enclosure is relatively light, of low rigidity and or small in relation to the drivers 2. The downside is that the footprint is bound by at least two times the depth of the identical drivers 2. Converging the drivers 2 is a method for decreasing the minimum amount of volume needed in the speaker design, as for example described in the not yet published patent application NL1042617 of the present applicant, which is incorporated herein by reference. A further development of loudspeaker devices possibly having a low profile are described in International patent application PCT/NL2018/050263 (not yet published) of the present applicant, which is also incorporated herein by reference.

In the situation that the opposing drivers 2 are used in an application where it is beneficial to minimize the speaker's size perpendicular to—and in line with the excursion direction, or where the generated air displacement should be directed towards a single surface, a new damper and porting method is provided by the present invention embodiments. Other damper and port methods are not usable in the converged driver architecture: when the membranes 7 make excursion inwards (towards each other), the variable distance between the membranes 7 would create a problematic situation for a static centered port as seen in e.g. US patent publication U.S. Pat. No. 8,452,041B2. Furthermore, high excursion drivers 2 require high excursion dampers. Conventional damper systems require a sizable amount of space in the x-y directions, the present invention seeks to reduce this footprint. Next to this, the damper element has to fit within the bounding box of approximately four times the magnet height, and create airtight chambers to create low distortion sound production. The invention embodiments enable surface displacement optimisation and reduced x-y surface usage.

Figure 2:
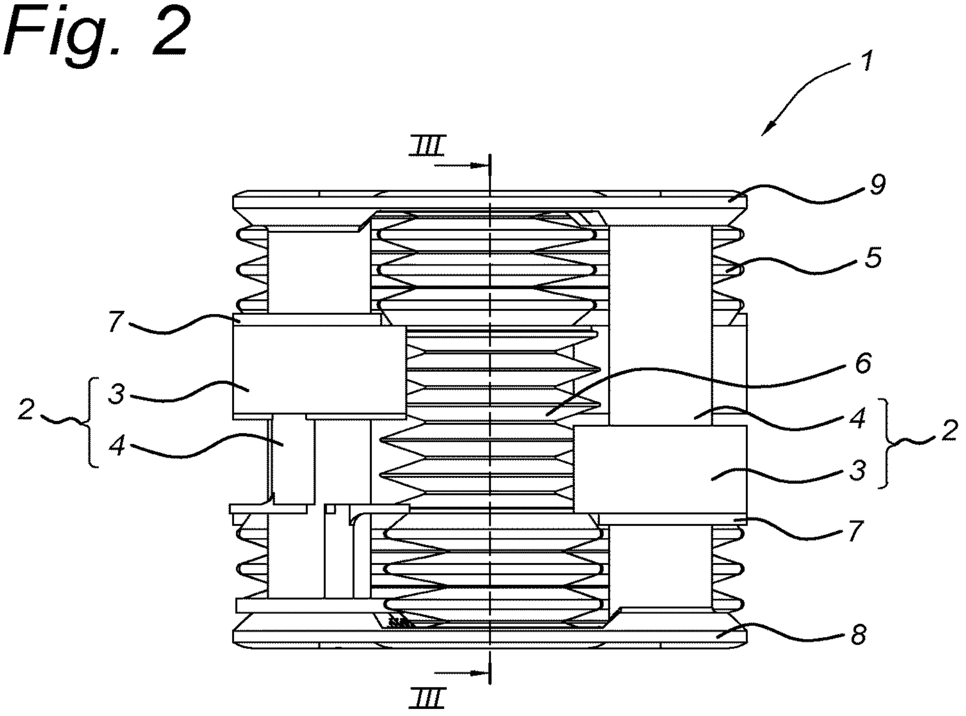
FIG. 2 shows a side view of the loudspeaker device shown in FIG. 1.

In the loudspeaker device exemplary embodiments shown in the FIGS. 1-3 and discussed below, the following elements are present (with reference numerals as indicated, and synonym terms between brackets):

1. speaker device (speaker, loudspeaker, loudspeaker device)
2. drive unit (driver, motor)
3. voice coil
4. magnet assembly (at least two magnets)
5. bellows element (bellow damper element, membrane damper bellows)
6. bellows port element (connection bellows)
7. membrane
8. vented frame element
9. closed frame element FIG. 1 shows a perspective view of the speaker device 1, and FIG. 2 a side view of the speaker device 1. FIG. 3 shows a cross sectional view of the speaker device of FIG. 2 along the lines III-III.

The present invention embodiments relate to a speaker device comprising two membranes 7 facing each other, and two drive units 2, each arranged for driving one of the two membranes 7 in opposite direction in operation. Furthermore, the speaker device 1 comprises a vented frame element 8 and a closed frame element 9, which are positioned outward on either side of the two membranes 7. In a first embodiment, at least one bellows element 5 is provided which is connected (e.g. air tightly, or in a substantially sealed manner) on a first side to the membrane 7 which is positioned closest to the closed frame element 9, and connected on a second side to the closed frame element 9 (also e.g. air tightly, or in a substantially sealed manner). This embodiment allows to provide a vented multiple drive unit speaker 1 which could be placed in a loudspeaker cabinet, having at least one bellows element 5 connected to (one of the) at least two membranes 7 that move in opposing directions, where the varying volume of the bellows 5 is used to displace air towards—and from free air (i.e. the speaker exterior), via the vented frame element 8. This embodiment can be seen as a speaker device with very little additional components, only having a bellows element 5 between the closed frame element 9 and the nearest membrane 7, yet providing improved efficiency of the speaker device 1. The air pathway from the enclosed space formed by closed frame element 9, bellows element 5 and nearest membrane 7 towards the speaker exterior can e.g. be formed via apertures in both membranes 7 (making these vented membranes 7), or via alternative pathways for air.

In a further embodiment (also in the exemplary embodiments shown in FIG. 1-3), the two membranes 7, the vented frame element 8 and the closed frame element 9 each comprise a substantially flat surface, which is perpendicular to the direction of opposite movement of the membranes 7 in operation. In other words, the speaker device comprises two frame elements 8, 9, wherein at least one frame element 9 is closed from free air, and at least one frame element 8 is vented.

The two membranes 7 are provided with a center aperture in a further embodiment. Such a vented multiple drive unit speaker device 1 having a membrane 7 which has an opening (or alternatively a port) allows to effectively accommodate air flow through the membrane 7 towards the speaker device exterior (via vented frame element 8).

In a further group of embodiments, the speaker device 1 comprises a bellows assembly 5, 6, wherein one end of the bellows assembly 5, 6 is (air tightly) connected on a first side to the membrane 7 which is positioned closest to the closed frame element 9, and (air tightly) connected on a second side to the vented frame element 8. This ensures a well-defined variable volume cavity within the speaker device 1, which cavity is substantially air tight or even sealed, efficiently providing acoustic waves from the opposing membranes 7 towards the speaker device exterior.

Figure 3:
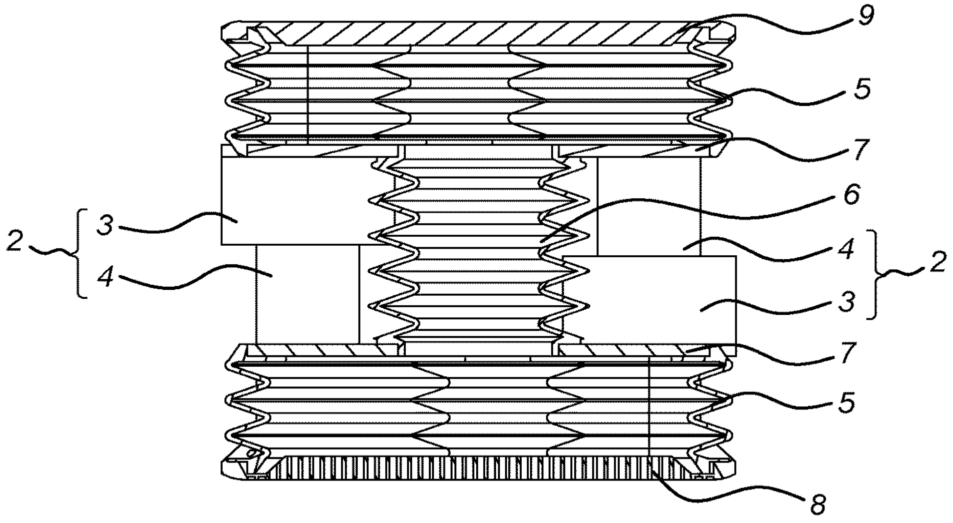
FIG. 3 shows a cross sectional view of the loudspeaker device shown in FIG. 2 along the lines III-III.

As present in the embodiments shown in FIG. 1-3, in a further embodiment, the bellow assembly 5, 6 comprises a first bellows element 5 (air tightly) connected on a first side to the membrane 7 which is positioned closest to the closed frame element 9, and (air tightly) connected on a second side to the closed frame element 9, a second bellows element 5 (air tightly) connected on a first side to the membrane 7 which is positioned closest to the vented frame element 8, and (air tightly) connected on a second side to the vented frame element 8, and a bellows port element 6 connected between the first sides of the first and second bellows element 5. This has the effect of providing a vented multiple drive unit speaker device 1 with a high efficiency. The bellow assembly may have at least three (connected) bellows elements 5, 6 mounted along a single axis, where the air inside of the at least three (connected) bellows elements 5, 6 is displaced towards free air (i.e. the speaker exterior). To obtain this effect the bellows elements 5, 6, are connected to the other components in a substantially air tight or even sealed manner.

In order to obtain a speaker device which is economical to manufacture, and which has a high degree of reliability, the first and second bellows element 5 and the bellows port element 6 are implemented as a single integrated bellows assembly, i.e. one single part.

In a further embodiment, the bellows port element 6 has a smaller cross sectional area than the first and second bellows elements 5. As the acoustic (open) path remains towards the speaker exterior, the speaker device 1 can be designed with greater flexibility. When looking at the cross sectional view shown in FIG. 3, it is clear that also, the connection bellows 6 has a smaller frontal surface than each of the connected membrane damper bellows 5.

In the exemplary embodiments shown in FIG. 1-3, also a further embodiment of the speaker device is implemented, wherein each drive unit 2 comprises one or more drive assemblies having a voice coil 3 and a magnet assembly 4. Each magnet assembly 4 e.g. comprises at least two magnets, to provide an efficient and forceful actuation of the attached membrane 7. In the embodiments shown in FIG. 1-3, the speaker device 1 comprises two drive assemblies 3, 4 per membrane 7, wherein the pairs of drive assemblies 3, 4 are diagonally placed, to effectively drive the membrane 7. As shown, the bellows assembly 5, 6 is positioned laterally within the confines of the drive assemblies 3, 4, effectively ensuring that the air that is in contact with the coil 3 and magnet 4 area (speaker interior) is isolated from free air. The drive unit 2 can drive the associated membrane 7, e.g. by directly attaching the voice coil 3 to the (flat) membrane 7, or alternatively via a separate attachment element, e.g. a bracket.

In an even further embodiment, the one or more drive assemblies 3, 4 are positioned at a perimeter of the speaker device 1, i.e. between the open and vented frame element 8, 9 and in the embodiment shown in FIG. 1-3 at the corners thereof. This allows to position the bellows assembly 5, 6 within the speaker 1 interior area, and to isolate the air from the speaker exterior from the speaker interior. In an even further embodiment, the vented frame element 8 and closed frame element 9 are held at a predetermined distance from each other, e.g. using a two by two arrangement of drive assemblies/drive units 2 as shown in the embodiments of FIG. 1-3. Using the drive units 2 to interconnect the vented frame element 8 and the closed frame element 9 provides for a very efficient and reliable construction of the speaker device 1. The present invention embodiments can also be described as relating to a loudspeaker 1 having a plurality of drive units 2, using a bellows or multiple bellows 5, 6 as a damper and/or air isolation method, allowing membrane excursion of at least two opposing membranes 7, and providing an air guiding method for the combined air displacement of the at least two opposing membranes 7. Each of the plurality of drive units 2, positioned in between the vented frame element 8 and closed frame element 9, is associated with at least one bellows like structure 5, 6, one voice coil 3 and a magnet assembly 4 (with at least two magnets). The bellows 5, 6 is fixed to the speaker frame elements 8, 9 and to membranes 7.

In an exemplary embodiment, the membrane damper bellows 5 are connected to the vented frame element 8 and to the closed frame element 9 and to the membranes 7. Each membrane 7 is connected to at least one membrane damper bellows 5. The air that is inside the bellows 5 is displaced towards the free air outside the speaker device 1. To enable the air of the damper bellows 5 to be directed towards a single surface (i.e. the open area of vented frame element 8), the bellows 5 are connected through a bellows port element 6 (or connection bellows). Because the bellows port element 6 is flexible, the membranes 7 can move towards each other without creating a collision with the bellows port element 6.

The present invention has been described above with reference to a number of exemplary embodiments as shown in the drawings. Modifications and alternative implementations of some parts or elements are possible, and are included in the scope of protection as defined in the appended claims.

The invention claimed is:

1. A speaker device comprising:

a first frame element disposed a first side of the speaker device and a second frame element positioned on a second, opposite side of the speaker device;

a first membrane disposed between the first frame element and the second frame element, the first membrane operably coupled to the first frame element;

a first variable-volume cavity between the first frame element and the first membrane;

a first drive unit configured to drive the first membrane inward and outward along an excursion axis relative to the first frame element;

a second membrane disposed between the first frame element and the second frame element, the second membrane facing the first membrane and operably coupled to the second frame element;

a second variable-volume cavity between the second frame element and the second membrane;

a second drive unit configured to drive the second membrane inward and outward along the excursion axis relative to the second frame element; and a connection element fluidically coupling the first variable-volume cavity and the second variable-volume cavity.

2. The speaker device of claim 1, wherein the first frame element is vented and the second frame element is closed.

3. The speaker device of claim 1, wherein each of the first membrane and the second membrane includes an aperture through which the connection element fluidically couples the first variable-volume cavity and the second variable-volume cavity.

4. The speaker device of claim 1, wherein the connection element comprises a bellows port element.

5. The speaker device of claim 1, wherein the connection element has a first end coupled to the first membrane and a second end coupled to the second membrane, and a variable length to accommodate relative movement of the first membrane and the second membrane along the excursion axis.

6. The speaker device of claim 1, wherein inward movement of the first membrane and the second membrane toward one another decreases air pressure within the first and second variable-volume cavities.

7. The speaker device of claim 1, wherein outward movement of the first membrane and the second membrane away from one another along the excursion axis increases air pressure within the first and second variable-volume cavities.

8. The speaker device of claim 1, wherein each of the first membrane, the second membrane, the first frame element, and the second frame element comprises a substantially flat surface oriented substantially perpendicular to the excursion axis.

9. The speaker device of claim 1, wherein each drive unit comprises one or more drive assemblies having a voice coil and a magnet assembly.

10. The speaker device of claim 9, wherein the one or more drive assemblies are positioned at a perimeter of the speaker device.

11. The speaker device of claim 1, wherein, wherein the first frame element and the second frame element are held at a predetermined distance from each other.

12. A speaker device comprising:

a first frame element and a second frame element spaced apart from one another along an excursion axis;

a first membrane disposed between the first frame element and the second frame element and configured to move inward and outward along the excursion axis relative to the first frame element, the first membrane defining a first volume between the first membrane and the first frame element;

a second membrane disposed between the first frame element and the second frame element, the second membrane configured to move inward and outward along the excursion axis relative to the second frame element, the second membrane defining a second volume between the second membrane and the second frame element; and a connection element fluidically coupling the first volume and the second volume.

13. The speaker device of claim 12, wherein the first frame element is vented and the second frame element is closed.

14. The speaker device of claim 12, wherein each of the first membrane and the second membrane includes an aperture through which the connection element fluidically couples the first volume and the second volume.

15. The speaker device of claim 12, wherein the connection element has a first end coupled to the first membrane and a second end coupled to the second membrane, and a variable length to accommodate relative movement of the first membrane and the second membrane along the excursion axis.

16. The speaker device of claim 12, wherein inward movement of the first membrane and the second membrane toward one another decreases air pressure within the first and second volumes.

17. The speaker device of claim 12, wherein outward movement of the first membrane and the second membrane away from one another along the excursion axis increases air pressure within the first and second volumes.

* * * * *